Dec. 29, 1931.  A. DINA  1,838,750
MOTION PICTURE PROJECTOR ADJUSTING AND LOCKING MECHANISM
Filed Feb. 15, 1928  3 Sheets-Sheet 1
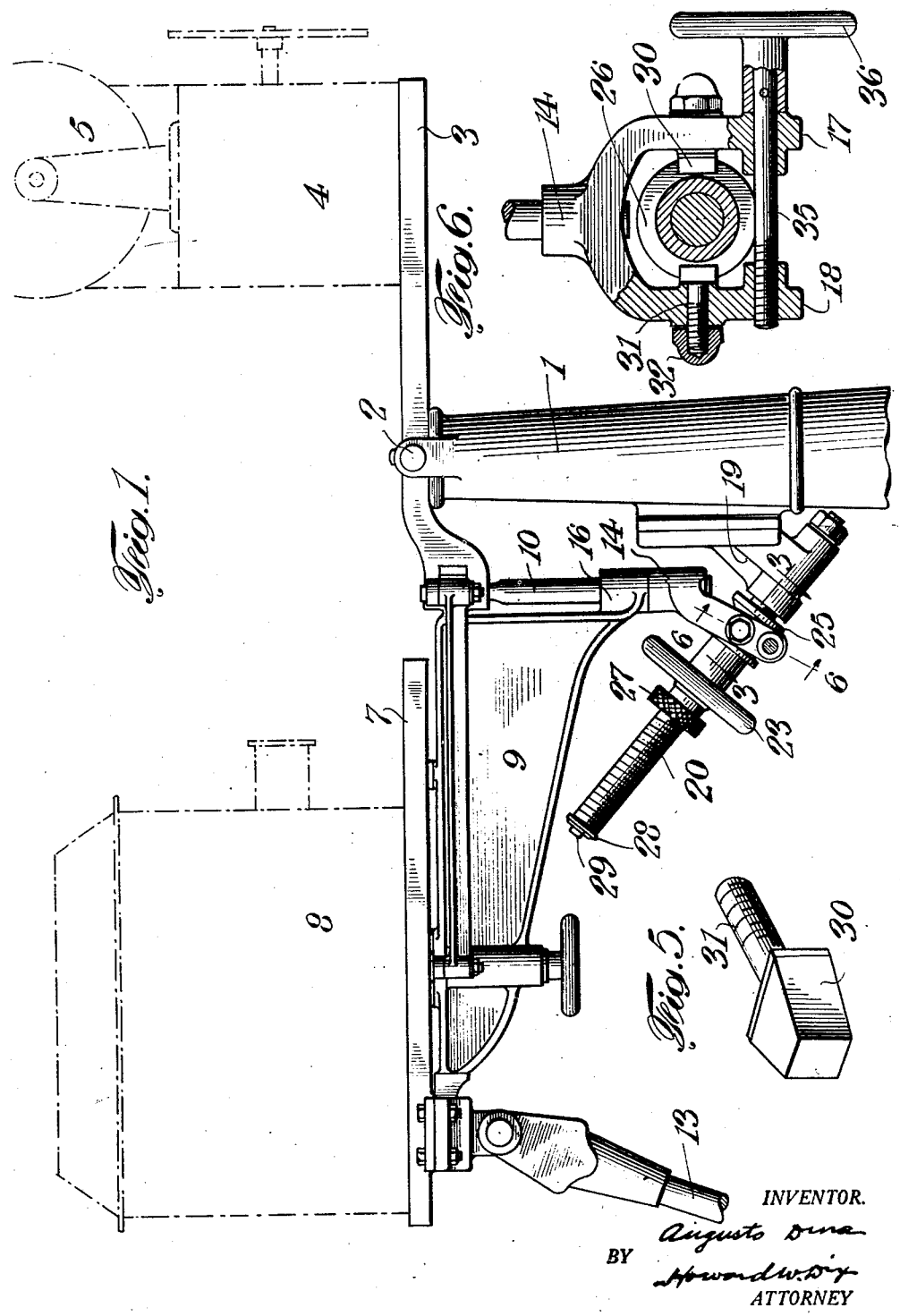
INVENTOR.
Augusto Dina
BY Howard W. Dix
ATTORNEY

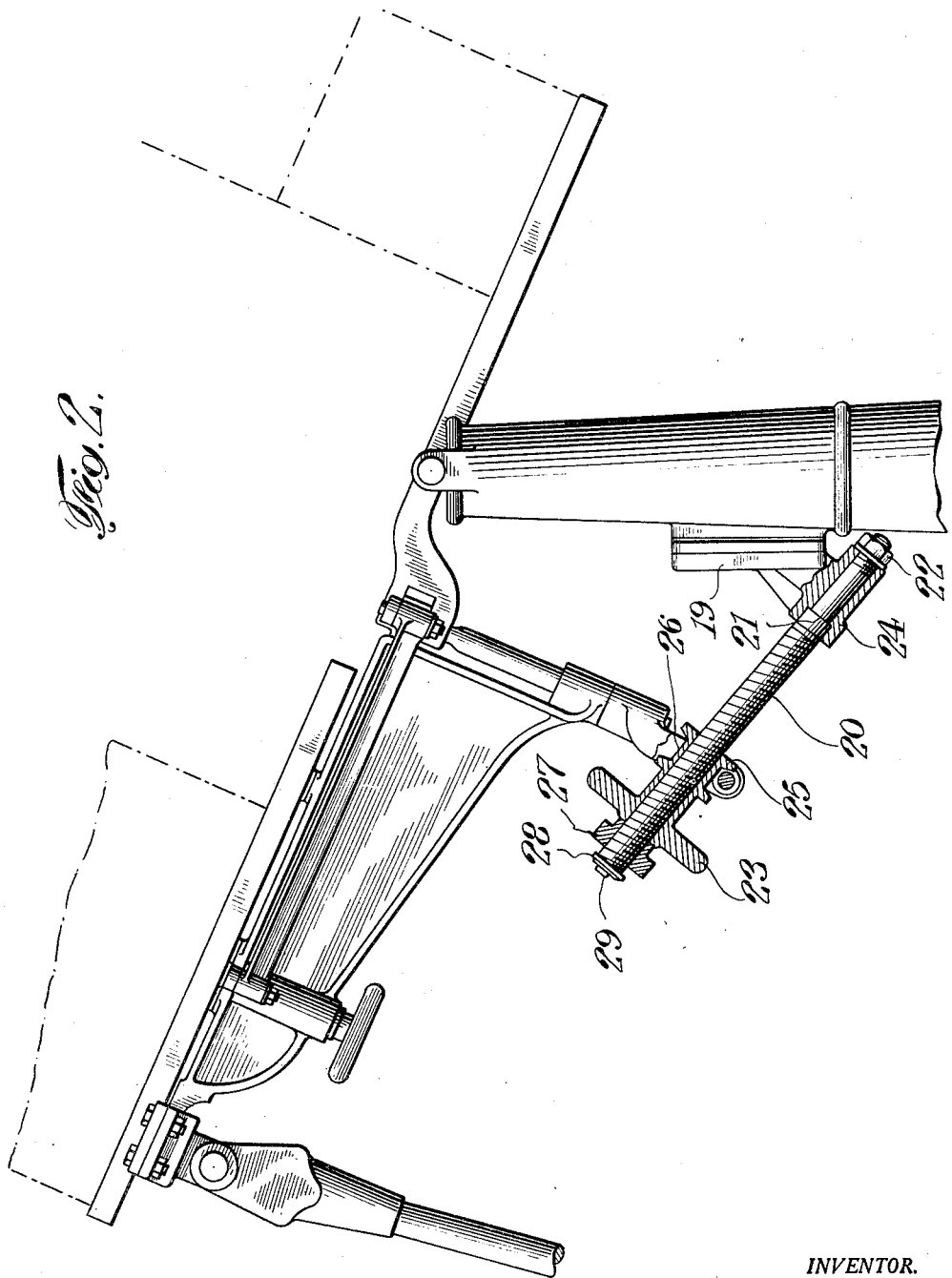

Dec. 29, 1931.    A. DINA    1,838,750
MOTION PICTURE PROJECTOR ADJUSTING AND LOCKING MECHANISM
Filed Feb. 15, 1928    3 Sheets-Sheet 3
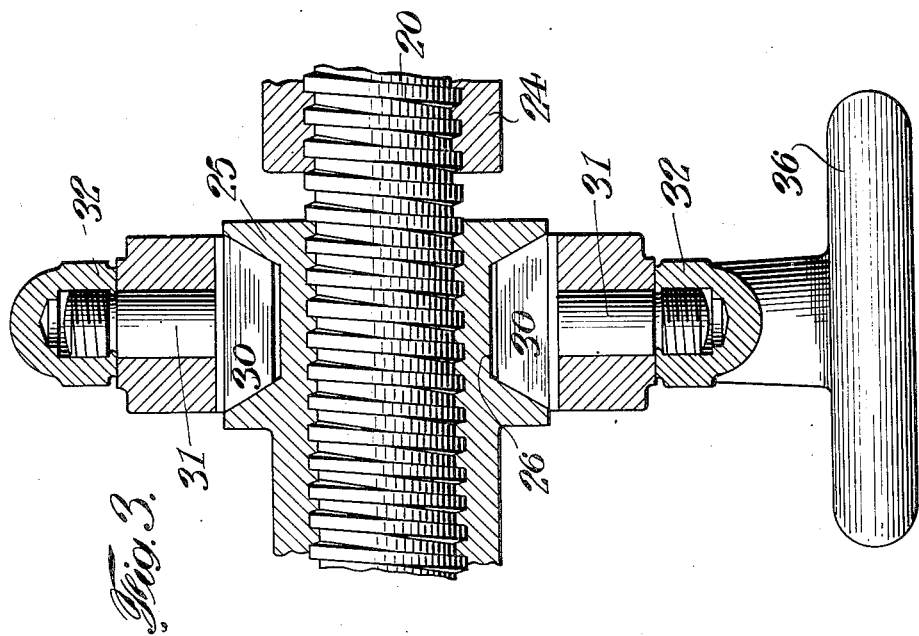
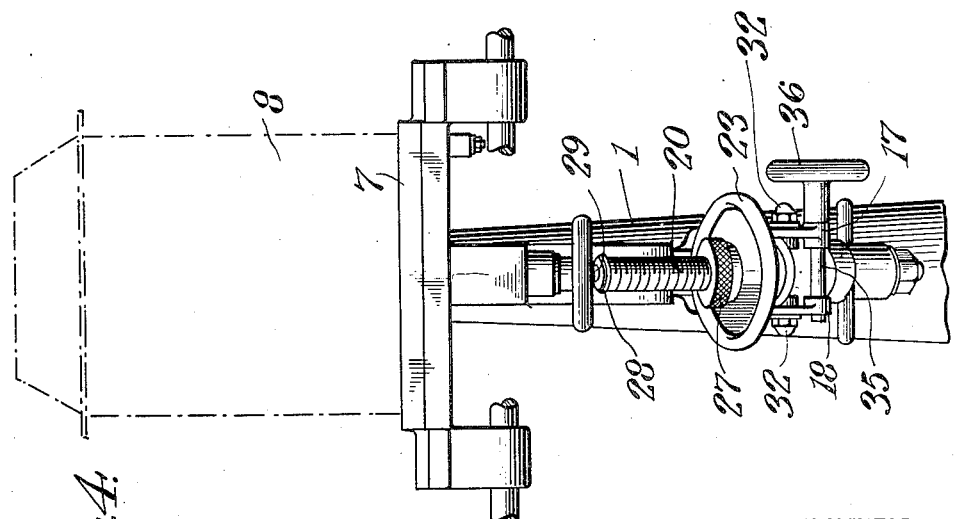
INVENTOR.
Augusto Dina
BY Howard W. Dix
ATTORNEY Patented Dec. 29, 1931

1,838,750

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

MOTION PICTURE PROJECTOR ADJUSTING AND LOCKING MECHANISM

Application filed February 15, 1928. Serial No. 254,433.

The invention relates in general to picture projection apparatus, and more particularly, to an adjusting device for adjusting the line of projection of said apparatus.

Picture projection apparatus for both motion and still pictures are usually mounted upon a pedestal or other device in such manner that the line of projection may be adjusted to register the projected picture upon the screen. It is desirable that the adjusting device be of such nature that the line of projection may be minutely adjusted, and also that the parts, when adjusted, may be absolutely rigid to prevent shifting or moving of the projected picture during operation.

According to one embodiment of the invention, the projection apparatus is pivoted to the top of a pedestal about a horizontal axis to permit adjustment of the line of projection. An adjusting device is provided for adjusting and fixing the position of the apparatus after the line of projection has been roughly adjusted. The adjusting device preferably comprises a threaded rod fixedly mounted upon the pedestal and a forked member connected to the support for the projection apparatus. A hand wheel having a wedge-shaped groove is threaded upon the rod. Straight wedge-shaped blocks fit tangentially in opposite sides of the groove and are pivoted to the forks. During adjustment the forked member rotates about the horizontal axis as a center. The particular connection between the forked member and the rigid rod is such as to permit fine adjustment of the projection apparatus and yet make a rigid support therefor.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation of a motion picture apparatus having an adjusting device according to the invention;

Fig. 2 is a side elevation similar to Fig. 1 showing the apparatus in a different position;

Fig. 3 is a section on the line 3—3 of Fig. 1.

Fig. 4 is a rear elevation of the projection apparatus;

Fig. 5 is a detail of the wedge-block; and

Fig. 6 is a section on the line 6—6 of Fig. 1.

In the following description and in the claims parts will be identified by specific names for convenience, but they are intended to be as generic in their application to similar parts as the art will permit.

Like reference characters denote like parts in the several figures of the drawings.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

Referring now to Fig. 1, the apparatus comprises a pedestal 1 mounted upon a suitable base (not shown). Suitably mounted at the top of the pedestal 1 by a horizontal pivot 2 is a support or plate 3 upon which rests the projection head 4 which may be of the usual type used in motion picture work, containing the necessary apparatus for shifting the film a picture at a time intermittently. The upper film magazine is denoted by 5, and the lower film magazine is omitted to conserve space.

Suitably secured to the front plate 3 is a rear plate 7 supporting the lamp house 8. The lamp house may be of any construction commonly used in motion picture work, and contains a suitable source of illumination. Suitable apparatus is provided whereby the lamp house 8 and supporting plate 7 may be shifted laterally so that its line of projection clears the projection head 4 for still picture work, it being understood that for motion picture work the axis of the lamp house 8 and of projection head 4 are in line.

The connection between the front and rear plates 3 and 7 includes an intermediate web-like member 9 pivoted to the front plate 3 by a pivot 10 perpendicular to the horizontal pivot 2. A suitable bracing device 13 may connect the lamp house plate 7 and the base (not shown) to brace or steady the apparatus, if desired. It will be understood that the details of the connection between the front and rear plates 3 and 7 are not material to the present invention.

The mechanism for adjusting the inclination of the line of projection includes an adjusting member 14 secured to the pivot 10 which passes through the sleeve 16 on the web 9. The adjusting member 14 may have at its lower end a pair of forks 17 and 18 as shown best in Fig. 6.

Rigidly secured to the side of the pedestal 1 is a bracket member 19 having a sleeve 24 in which is suitably secured a threaded rod 20. The threaded rod 20 has a shoulder 21 and a nut 22 between which the sleeve is clamped to rigidly secure the threaded rod to the pedestal.

Threaded upon the rod 20 is a hand wheel 23 provided with a collar 25 having a wedge-shaped annular groove 26. Also threaded on the rod 20 is a knurled lock collar 27 which is used for locking the hand wheel in adjusted position. The upper end of the rod may be provided with a plate 28 suitably screwed to the rod 20 by a screw 29 to provide an abutment to prevent accidental detachment of the lock collar 27.

Disposed in the groove 26 on opposite sides thereof and in tangential relation thereto are wedge-shaped blocks 30 illustrated in Fig. 5, each block having a stud shaft 31 journalled in one of the forks 17 and 18. The outer ends of the stud shafts 31 are threaded, and suitable cap nuts 32 are provided to aid in holding the parts in assembled relation.

The lower end of the adjusting member 14 (Fig. 6) is provided with a clamp rod 35 which passes freely through fork 17 and is threaded into the other fork 18. The rod is provided with a hand wheel 36 whose hub abuts the fork 17 and by which the forks 17 and 18 may be sprung to clamp the collar 25 between the wedge blocks 30 after the adjustment has been made.

To operate the adjusting device for shifting the axis of projection about the horizontal pivot 2, it will be understood that the hand wheel 36 and the lock collar 27 are loosened and the hand wheel 23 rotated to shift the axis of projection to proper position. It will be understood that the stud shafts 31 are free to rotate in the forks 17 and 18 and the wedge blocks are free to move tangentially in the groove 26 as the collar 25 rotates. After the adjustment has been made, the hand wheel 36 and lock collar 27 may be rotated to lock the parts in position.

Thus it will be seen that an adjusting device has been provided which is simple in construction and dependable in operation. The adjustment may be made with great ease and the arrangement is such that, after adjustment, the parts may be clamped so that the frame or support for the motion picture apparatus is absolutely rigid. The device is inexpensive to make and the parts may be made rugged so that long and satisfactory service may be obtained.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a device of the character described, a threaded member, an adjusting member having pivotal relation thereto, an adjusting element threaded on said threaded member, blocks engaging said element tangentially, said blocks and element having axially interlocking relation, and pivot means connecting said blocks and said adjusting member.

2. In a picture projection machine, a pedestal an elongated member secured thereto, an adjusting member having pivotal relation to said pedestal and to said elongated member, an adjusting element adapted to move along said elongated member, a cross member constrained to move axially with said element but free to move transversely thereof, said adjusting member being pivoted to said cross member.

3. In combination, an annular member, elements engaging said member, means for moving said member and elements relatively circumferentially and relatively tangentially, and means for clamping said member between said elements.

4. In combination, a member having a circular wedge-shape groove, wedge-shape blocks fitting in opposite sides of said groove, means for moving said blocks tangentially, means for rotating said member, and means for clamping said member between said blocks to rigidly wedge them together.

5. In a picture projection machine, a base, a support movably secured to said base, an adjusting member secured to said support, said member having forks, a threaded rod secured to said base, an adjusting element threaded on said rod and having a wedge-shaped, annular groove, straight wedge-shape blocks tangentially fitting opposite sides of said groove, said blocks being journalled on their respective forks, means for clamping said blocks in said groove and for locking said element on said rod.

6. In a picture projection machine, a pedestal, a support pivoted to the top of said pedestal about a horizontal axis, an adjusting member secured to said support, said member having forks, a threaded adjusting rod fixedly secured to said pedestal in inclined position, a hand wheel threaded on said rod and having a wedge-shaped, annular groove, straight wedge-shape blocks tangentially fitting in opposite sides of said groove, said blocks having pins journalled in their respective forks, a clamp rod passing freely through the end of one fork and threaded into the end of the other fork, a hand wheel on said clamp rod, and a lock collar threaded on said adjusting rod.

AUGUSTO DINA.